(12) United States Patent
Coussement

(10) Patent No.: US 7,801,111 B2
(45) Date of Patent: Sep. 21, 2010

(54) CAPABILITY-BASED ROUTING

(75) Inventor: Stefaan Valere Albert Coussement, Kortrijk (BE)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 1033 days.

(21) Appl. No.: 09/800,679

(22) Filed: Mar. 6, 2001

(65) Prior Publication Data

US 2002/0114278 A1 Aug. 22, 2002

Related U.S. Application Data

(63) Continuation-in-part of application No. 09/791,282, filed on Feb. 22, 2001.

(51) Int. Cl.
*H04L 12/66* (2006.01)
(52) U.S. Cl. .............. 370/352; 379/265.05; 379/265.13
(58) Field of Classification Search ................. 370/352, 370/351, 353, 354, 355, 356; 379/265.01–266.1
See application file for complete search history.

(56) References Cited

U.S. PATENT DOCUMENTS

| | | | | |
|---|---|---|---|---|
| 5,592,543 A * | 1/1997 | Smith et al. | ............ | 379/266.07 |
| 5,926,539 A * | 7/1999 | Shtivelman | ............ | 379/266.01 |
| 6,424,709 B1 * | 7/2002 | Doyle et al. | ............ | 379/265.02 |
| 6,553,113 B1 * | 4/2003 | Dhir et al. | ............ | 379/265.02 |
| 6,556,671 B1 * | 4/2003 | Beauvois | ............ | 379/265.02 |
| 6,560,329 B1 * | 5/2003 | Draginich et al. | ...... | 379/265.02 |
| 6,681,010 B1 * | 1/2004 | Anderson et al. | ...... | 379/265.11 |
| 6,687,241 B1 * | 2/2004 | Goss | ........................ | 370/352 |
| 6,766,012 B1 * | 7/2004 | Crossley | ............... | 379/265.02 |
| 7,092,509 B1 * | 8/2006 | Mears et al. | ........... | 379/266.01 |

FOREIGN PATENT DOCUMENTS

WO WO 99/14920 A 3/1999
WO WO 01/01660 A 1/2001

OTHER PUBLICATIONS

M Day et al., A model for Presence and Instant Messaging, Request for Comments (RFC) 2778, Feb. 2000, pp. 1-17, XP002201444, IETF-Network Working Group.
J. Rosenberg, H. Schulzrinne, SIP For Presence draft-rosenberg-sip-pip-00.txt, Nov. 13, 1998, pp. 1-21, XP002325320, Internet Engineering Task Force Internet Draft.

* cited by examiner

*Primary Examiner*—Jason E Mattis
(74) *Attorney, Agent, or Firm*—Central Coast Patent Agency, Inc.

(57) ABSTRACT

In a communications network environment, a distributed software application for monitoring terminal and device capabilities of agents operating on the network and rendering data results of the monitoring to subscribing routing applications is provided. The software application comprises a first portion of the software for collecting and sending data about terminal and device capabilities of the target agents and a second portion of the software for receiving the capability data and for presenting the data in usable form to the subscribing routing applications.

39 Claims, 6 Drawing Sheets

US 7,801,111 B2

CAPABILITY-BASED ROUTING

CROSS-REFERENCE TO RELATED DOCUMENTS

The present application is related as a Continuation-in-Part (CIP) to a copending application, Ser. No. 09/791,282 entitled, "Distributed Hardware/Software System for Managing Agent Status in a Communication Center", filed on Feb. 22, 2001, by the same inventor.

FIELD OF THE INVENTION

The present invention is in the field of telecommunication, encompassing all existing sorts of interaction multimedia technology, and pertains more particularly to a system for routing communications based on preferences and capabilities of communication-center agents and agent resources.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known in the art as computer-telephony integration (CTI). Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI processors and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display units (PCNVDU) so that agents manning such stations may have access to stored data as well as being linked to incoming callers by telephone equipment. Such stations may be interconnected through the PC VDU by a local area network (LAN). One or more data or transaction servers may also be connected to the LAN that interconnects agent stations. The LAN is, in turn, typically connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used as a key to access additional information from a customer information system (CIS) database at a server on the network that connects the agent workstations. In this manner information pertinent to a call may be provided to an agent, often as a screen pop on the agent's PCNVDU.

In recent years, advances in computer technology, telephony equipment, and infrastructure have provided many opportunities for improving telephone service in publicly switched and private telephone intelligent networks. Similarly, development of a separate information and data network known as the Internet, together with advances in computer hardware and software have led to a new multimedia telephone system known in the art by several names. In this new systemology, telephone calls are simulated by multimedia computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

Both DNT and COST systems use signals transmitted over network links. In fact, connection to data networks for DNT such as IPNT is typically accomplished over local telephone lines, used to reach points in the network. These hosted connection interfaces are known as Internet Service Providers (ISPs). The definitive difference between these categories is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, routed, and received as data packets over a data-network. The data packets share network links, and may travel by varied and variable paths.

Recent improvements to available technologies associated with the transmission and reception of data packets during real-time DNT communication have enabled companies to successfully add DNT, principally IPNT, capabilities to existing CTI call centers. Such improvements, as described herein and known-to the inventor, include methods for guaranteeing available bandwidth or quality of service (QOS) for a transaction, improved mechanisms for organizing, coding, compressing, and carrying data more efficiently using less bandwidth, and methods and apparatus for intelligently replacing lost data via using voice supplementation methods and enhanced buffering capabilities.

In addition to Internet protocol (IPNT) calls, a DNT center may also share other forms of media with customers accessing the system through their computers. E-mails, video mails, fax, file share, file transfer, video calls, and so forth are some of the other forms of media which may be used. This capability of handling varied media leads to the term multimedia communications center, which is used in this application. A multimedia communications center may be a combination CTI and DNT center, or may be a DNT center capable of receiving COST calls and converting them to a digital DNT format. The term communication center will replace the term call center hereinafter in this specification when referring to multi-media capabilities.

In typical communication centers, DNT is accomplished by Internet connection and IPNT calls. For this reason, IPNT and the Internet will be used in examples to follow. IT should be understood, however, that this usage is exemplary, and not limiting.

In systems known to the inventors, incoming IPNT calls are processed and routed within an IPNT-capable communication center in much the same way as COST calls are routed in a CTI-enhanced call-center, using similar or identical routing rules, waiting queues, and so on, aside from the fact that there are two separate networks involved. Communication centers having both CTI and IPNT capability typically utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVR), agent-connecting networks, and so on, with the capability of conforming to Internet protocol, call data arriving from either network may be integrated requiring less equipment and lines to facilitate processing, storage, and transfer of data.

With many new communication products supporting various media types available to businesses and customers, a communication center must add significant application software to accommodate the diversity. For example, e-mail programs have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

One challenge facing a multimedia communication center involves the routing of calls and other interaction events. By utilizing enhanced CTI capabilities, communication centers known to the inventor can apply internal routing rules within a telephone network so that internal routing capabilities extend into the network. This is accomplished by enhancing telephony switches both within the center and at network level with CTI processors running transaction server software. Distributed CTI components are interconnected for communication by a separate data network. This technique greatly enhances COST routing capability within a communication center. However, with multimedia centers wherein agents utilize a plurality of terminals running a variety of software applications, internal routing of events requires considerable software configuration and central control. This is especially true if intelligent routing routines are incorporated that enable routing according to skill set, agent availability, predictive or statistical results, and so on.

In current art, terminal capabilities including software capabilities and user/agent preferences are not taken into account when routing events within a communication center. Event routing is currently performed around three basic sets of attributes. Call-associated attributes such as routing based on DNIS etc. make up the simplest of these attributes. Interaction attributes are obtained via interaction with clients such as by interactive voice response (IVR) automates. Configured attributes, the most complex, include agent availability states, agent skills, language preferences, and so on. In some cases, capabilities such as Web-enabled communication capabilities are coded and listed as agent skills in skill based routing routines. However, this must be initiated during configuration of the main communication center routing system, which in all cases, is centrally controlled.

In a distributed software system known to the inventor and listed under the cross-reference section as "Distributed Hardware/Software System for Managing Agent Status in a Communication Center", distributed agents of the software application monitor communications capabilities and operating states of agents operating on a communications network and render the data results of the monitoring to subscribing applications using a known presence reporting protocol. The software application comprises a first portion of the software for collecting and sending data about communications capabilities and states of activity of the target agents, and a second portion of the software for receiving the data about communications capabilities and states of activity of the target agents and for summarizing the data into a usable form for rendering to the subscribing applications, which are typically event routing applications.

It has occurred to the present inventor that routing internal events in a communication center could be accomplished according to discoverable capabilities using a distributed software system if such routines are based on information attainable and reportable from agent communication terminals or host terminals controlling or monitoring them. In prior art, there is little if any integration enabling a composite view of all of the capabilities of an agent's station or communication center preferences for media types that may include versions of enabling software.

A protocol known to the inventor and used in some Internet-based applications enables discovery and communication of certain capabilities and preferences of nodes connected to the network. The protocol known as composite-capability/preference profiling (CC/PP) was recently developed and refined by the World Wide Web Consortium (W3C). The goal of CC/PP framework is to specify how client devices express their capabilities and preferences, user/agent profile, to a network-connected server that serves data content. CC/PP framework uses a known resource description format (RDF)

to organize capabilities and preferences for propagation through the network. Optimally, extensible markup language (XML) is used as the descriptor language for expressing the values.

The current use of CC/PP is to enable tailored content to be downloaded to requesting nodes wherein the content is tailored according to the discovered capabilities of the requesting node and in part to user preferences associated with a user operating the node and authorizing the data request. CC/PP information is typically collected and propogated during a current data session between a client node and a content provider.

A good example of the use of CC/PP is that of a user downloading a software program from a server on the network and installing the software at his or her node. Discoverable capabilities include type of node, platform, version of operating system, existence of any potentially conflicting programs, current version of replaced program, and so on. User preferences may include description of custom download and install, preference of certain program features over others, and so on.

There are known software systems that are capable of taking an inventory of the capabilities of a terminal and rendering the information available to a requesting node. In some cases terminals have a special memory dedicated to all kinds of manufacturing and maintenance data, and those memories can usually be read using some special commands. In other cases, there are inventory software programs installed on servers or on remote accessing nodes that are capable of discovering which software programs and versions are installed on the remote node. However, information available to and collected by these methods has not been utilized for interaction purposes such as event routing, either on a data network or within the scope of a communications center.

What is clearly needed is a distributable capability and preference discovery and reporting system that may be integrated with routing applications operating within a communication center environment. Such a system should be easily implemented, readily updateable, and would avoid the drawbacks of a centrally controlled and integrated monitoring and reporting system.

SUMMARY OF THE INVENTION

In a preferred embodiment of the present invention an agent proxy application for monitoring target agent resources and rendering capability information to routing applications is provided, comprising a first portion for collecting data regarding capability of the target agent resources, and a second portion for integrating the data and rendering the capability information to the routing applications.

In some embodiments the target agent resources comprise one or more individual agent stations in at least one communication center, the agent stations equipped with one or more communication devices. There may be multiple copies or versions of the first portion executing on platforms monitoring individual ones of the one or more communication devices, and providing data to at least one agent proxy server executing a copy of the second portion, the at least one agent proxy server dedicated to integrating the data for the one or more communication devices.

In some embodiments one or more of the platforms upon which the first portions execute are computers in the agent stations. In other embodiments one or more of the platforms upon which the first portions execute comprise individual ones of the one or more communication devices. In still other embodiments one or more of the platforms upon which the first portions execute comprise individual service proxy platforms also enabling services for one of the communication devices. The service proxy platform may be a Voice-over-Internet Protocol (VoIP) proxy enabling a VoIP telephone or a call-control gateway platform.

In some embodiments of the invention the first portions provide data to more than one agent proxy server to provide redundancy. Further, the platforms, agent stations and subscribing applications may be all a part of a single communication center, or distributed over a plurality of communication centers.

In some embodiments more than one first portion is dedicated each to distinct ones of the communication devices associated with a single agent station, and the data from the more than one first portion is aggregated for the single agent station at the agent proxy server associated with the single agent station. In other embodiments there may be multiple sets of agent stations having communication devices monitored by the copies or versions of the first portion and multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers.

In various embodiment the platforms, agent stations and subscribing applications are all a part of a single communication center, while in other embodiments the platforms, agent stations and subscribing applications may be distributed over a plurality of communication centers.

In another aspect of the invention an agent proxy system operable in at least one communication center is provided, the system comprising agent resources enabling agents to process communication events, one or more agent proxy servers, one or more routing applications subscribing to one or more of the agent proxy servers, a communication network connecting the agent resources, the applications and the one or more agent proxy servers, and a capability application for monitoring capabilities of the agent resources and for rendering capability information to the subscribing routing applications, the capability application having a first portion for collecting information regarding capabilities of the target agent resources, and a second portion for integrating the information and rendering the capability information to the subscribing routing applications.

In some embodiments the agent resources comprise one or more individual agent stations in at least one communication center, the agent stations equipped with communication devices. Also in some embodiments multiple copies or versions of the first portion execute on platforms monitoring individual ones of the one or more communication devices, and provide data to at least one agent proxy server executing a copy of the second portion, the at least one agent proxy server dedicated to integrating the data for the one or more communication devices.

In some one or more of the platforms upon which the first portions execute are computers in the agent stations, while in other embodiments one or more of the platforms upon which the first portions execute comprise individual ones of the one or more communication devices. In still other embodiments one or more of the platforms upon which the first portions execute comprise individual service proxy platforms also enabling services for one of the communication devices.

The service proxy platform may be a Voice-over-Internet-Protocol (VoIP) proxy enabling a VoIP telephone or call-control gateway platform.

In some cases the first portions provide data to more than one agent proxy server to provide redundancy. Also in some embodiments the platforms, agent stations and subscribing applications are all a part of a single communication center, while in other embodiments the platforms, agent stations and subscribing applications may be distributed over a plurality of communication centers.

IN various embodiments more than one first portion is dedicated each to distinct ones of the communication devices associated with a single agent station, and the data from the more than one first portion is aggregated for the single agent station at the agent proxy server associated with the single agent station.

In some embodiments there may multiple sets of agent stations having communication devices monitored by the copies or versions of the first portion and multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers. The platforms, agent stations and subscribing applications may be all a part of a single communication center, or distributed over a plurality of communication centers.

In yet another aspect of the invention a method for providing agent resource capabilities to subscribing routing applications is provided, comprising the steps of (a) monitoring capabilities of individual agent resources by a first portion of a resource capability application, and (b) integrating data from step (a) and rendering agent resource capabilities to the subscribing routing applications by a second portion of the agent resource capability application.

In some embodiments, in step (a), the agent resources comprise individual agent stations equipped with one or more communication devices. Also in some embodiments multiple copies or versions of the first portion execute on platforms monitoring individual ones of the one or more communication devices, and provide data to at least one agent proxy server executing a copy of the second portion, the at least one agent proxy server dedicated to integrating the data for the one or more communication devices.

In some cases the one or more of the platforms upon which the first portions execute are computers in the agent stations, while in other cases one or more of the platforms upon which the first portions execute comprise individual ones of the one or more communication devices. In other instances the platforms upon which the first portions execute may comprise individual service proxy platforms also enabling services for one of the communication devices. These may include a Voice-over-Internet-Protocol (VoIP) proxy enabling a VoIP telephone or a call-control gateway platform.

In some cases the first portions provide data to more than one agent proxy server to provide redundancy. The platforms, agent stations and subscribing applications may be all a part of a single communication center, or may be distributed over a plurality of communication centers.

In some embodiments more than one first portion is dedicated each to distinct ones of the communication devices associated with a single agent station, and the data from the more than one first portion is aggregated for the single agent station at the agent proxy server associated with the single agent station. In other embodiments multiple sets of agent stations may have communication devices monitored by the copies or versions of the first portion and there may be multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers.

The platforms, agent stations and subscribing applications may be all a part of a single communication center, or distributed over a plurality of communication centers.

In the various embodiments of the invention described in enabling detail below, for the first time ability to monitor capabilities of agent resources and to provide capability information to routing applications is provided, such that capability of agent resources may be used by routers in discriminating destinations in routing communication events.

BRIEF DESCRIPTION OF THE DRAWING FIGURES

DESCRIPTION OF THE PREFERRED EMBODIMENTS

In accordance with a preferred embodiment of the present invention the inventor provides a distributable software application for improving the reporting of various active agent-states related to communication capabilities to subscribing applications within, or in some cases external to a communication-center. The method and apparatus of the present invention is described in enabling detail below.

Figure 1:
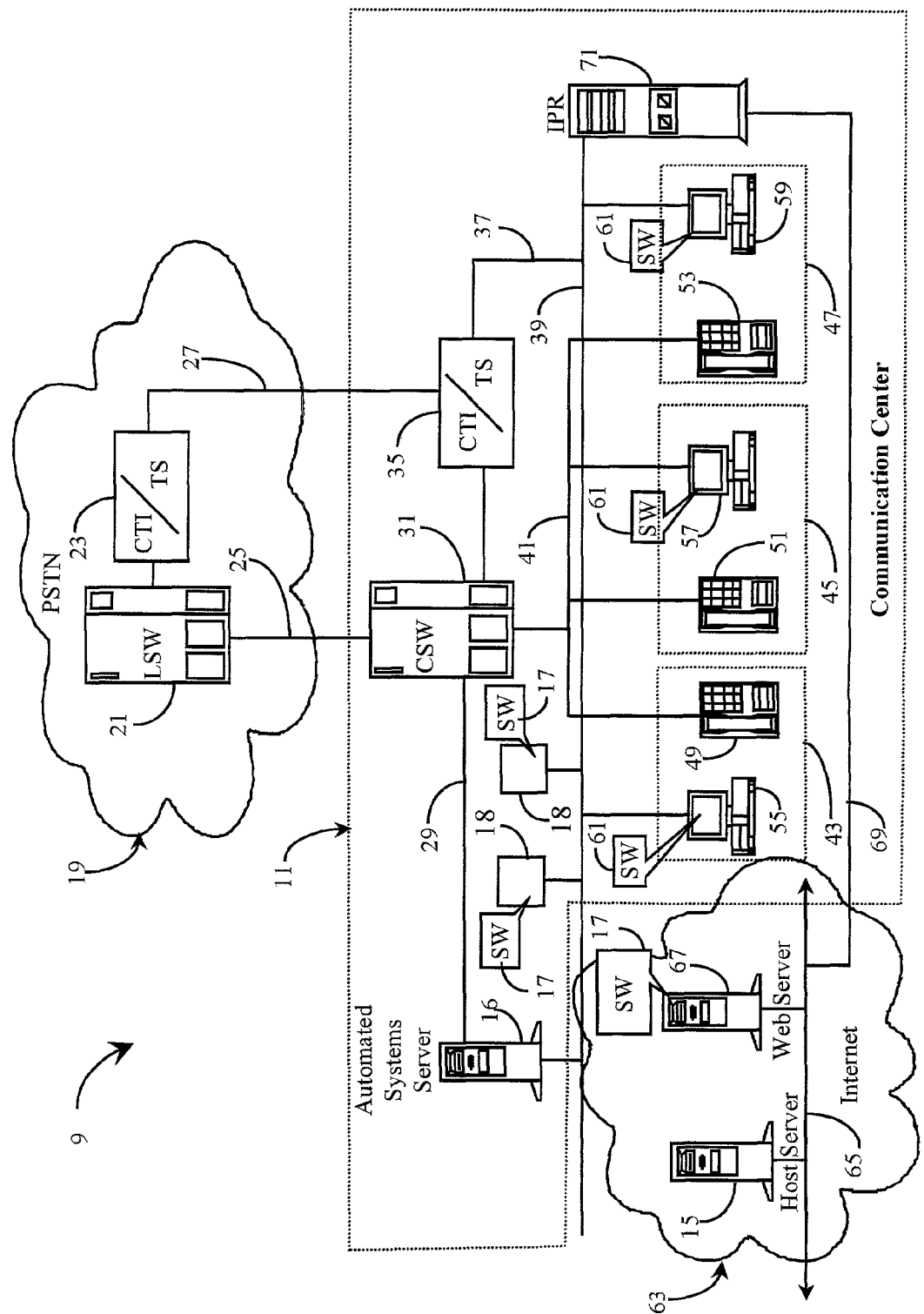
FIG. 1 is an overview of a communication network wherein capability-based routing is practiced according to an embodiment of the present invention.

FIG. 1 is an overview of a communication network 9 wherein a distributed system for monitoring agent status and communication ability, and making the information available to subscribing applications is utilized according to an embodiment of the present invention. Communication network 9 comprises a public-switched-telephone-network (PSTN 19), a data-packet-network (DPN) 63, which in a preferred embodiment is the well-known Internet network, and a communication center 11.

PSTN 19 may, in an alternative embodiment, be a private telephone network instead of a public one as exemplified herein. DPN 63, which in this example is the well-known Internet, is chosen by the inventor as a preferred DPN because of its high public-access characteristic. Hereinafter DPN 63 will simply be referred to as Internet 63. Internet 63 may instead be a corporate or private wide-area-network (WAN) without departing from the spirit and scope of the present invention. Internet 63 is further exemplified by an Internet backbone 65 illustrated as extending through cloud 63. Backbone 65 represents all of the lines, connections and equipment making up the Internet network as a whole. Therefore, there are no geographic limitations to practice the present invention.

Communication center 11 represents a state-of-the-art communication center capable of handling both COST interactions and DNT interactions including those using Internet Protocol (IP). Communications center 11 may be any type of communication center or information-source facility. A good example of communication center 11 would be that of a customer-assistance center for a large computer manufacturer. Communication center 11 may be a very large center employing hundreds of agents or a very small center employing just a few agents without departing from the spirit and scope of the present invention.

PSTN 19 represents the mediums through which all COST calls destined to communication center 11 are propagated. A local switch (LSW) 21 is illustrated within PSTN 19 and represents a telephony switch as known in the art for switching calls. In this example, LSW 21 is connected to a central switch (CSW) 31 illustrated within communication center 11 by a telephony trunk 25. LSW 21 as well as CSW 31 may be automatic-call-distributor (ACD) switches or any other known telephone switches capable of processing COST events.

A computer-telephony-integration (CTI) processor 23 is provided within PSTN 19 connected to LSW 21 by a CTI link. CTI processor 23 is adapted to provide at least intelligent routing capability to LSW 21. A similar CTI processor 35 is provided within communication center 11 and is illustrated as connected to CSW 31 by a CTI link. CTI processor 35 is adapted to provide at least intelligent routing capability to CSW 31. CTI processor 23 within PSTN 19 is connected to CTI processor 35 within communication center 11 by a data network connection 27 separate from telephone trunk lines. Data network 27 enables extension of intelligent routing routines from within communication center 11 into PSTN 19. More specifically LSW 21, representing just one of many similarly connected switches or Service Control Points (SCP) in the network, may do, for example, agent-level routing by virtue of communication capability between processors 35 and 23. This mechanism enables intelligent network routing of incoming communication events to occur at LSW 21.

Intelligent routing commands are distributed from processor 35 over data network 27 to processor 23 by virtue of a software instance known to the inventor as a transaction server (TS). Intelligent routing capabilities may include, but are not limited to, routing based on agent skills, statistical routing, predictive routing, priority routing, agent-availability routing, and a host of other routing protocols. Data network 27 also enables information about callers to arrive within communication center 11 ahead of connection of the actual calls. In addition to instances of TS illustrated within processor 35 and 23 of this example, other functions may be provided without departing from the spirit and scope of the present invention. Examples include interactive-voice-response (IVR) capability, and other types of intelligent peripheral services.

In some communication networks known to the inventor, the capability exists of bridging, for example, PSTN 19 and Internet 63 such that calls originating from both networks may be routed into and supported by their bridged counterparts. For example, calls originating from PSTN 19 may be converted to DNT calls and routed through Internet 63 to communication center 11. Similarly, calls originating from Internet 63 may be converted to COST events and routed to communication center 11 through PSTN 19. Such functionality is not specifically illustrated in this example but may be assumed to be present in some embodiments.

Also, other media than pure voice calls can be used. For example, web based calls, video calls, video mail, e-mail, chat, chat-relays etc. just to name a few types of "calls" or communications.

Communication center 11 has illustrated therein a plurality of agent workstations such as stations 43, 45, and 47. Stations 43-47 are adapted as communication stations each containing appropriate communications equipment and software used by agents for external and internal communication. In this example each agent workstations 43-47 has at least a personal computer/video display unit (PC/VDU) and a telephone. For example, within agent workstations 43 a PC/VDU 55 and a telephone 49 are illustrated. A PC/VDU 57 and a telephone 51 are illustrated within station 45. A PC/VDU 59 and a telephone 53 are illustrated within station 47. Telephones 49-53 are connected to CSW 31 by internal telephony wiring 41. In other embodiments the agent equipment may be more extensive than that illustrated here, such as WAP-enabled telephones, pagers, fax machines, and more.

It will be apparent to one with skill in the art that there may be many more agent stations operating within communication center 11 than are illustrated in this example. Also, in some cases, some or all of the agents may be "remote agents" working, for example from home, mobile (on the road) or from small satellite offices, rather than from a large, conventional call center. The inventor deems that illustration of three agent stations is adequate for the purpose of explanation and illustration of the present invention. Moreover, in some more advanced embodiments, known to the inventor, telephones 49-53 may be connected to their respective PC/VDUs by physical cabling enabling agents to answer incoming calls using the telephone or the PC/VDU.

PC/VDUs 55-59 share connection to a local-area-network (LAN) 39. In this example, LAN 39 is adapted to support Internet protocols in a addition to other LAN protocols. LAN 39 facilitates intercommunication between agents within communication center 11 and other communication center systems. For example, CTI processor 35 is connected to LAN 39. Information about callers retrieved as a result of interaction with callers at LSW 21, or by peripheral equipment associated with LSW 21, may be distributed to appropriate agent PC/VDUs 55-59 ahead of routed COST calls via data network 27 and LAN 39.

An Internet protocol router (IPR) 71 is provided within communication center 11 and is connected to LAN 39. IPR 71 is also connected to Internet backbone 65 by an Internet access line 69. Internet access line 69 may be a 24×7 Internet connection or a switched Internet connection. IPR 71 routes IP events originating from Internet 63 to appropriate agents. IP events may include e-mails, IPNT phone calls, and so on. In one embodiment IPR 71 may be further enhanced with digital interactive voice response (DIVR) capability.

An automated systems server (ASS) 16 is illustrated within communication center 11 and is connected to LAN 39 via a LAN connection, and to CSW 31 by a digital data line 29. ASS 16 is adapted as an automated system server capable of initiating one type or many types of automated communication events such as facsimiles, e-mails, voice mails, and other automated response mechanisms. ASS 16 may also be adapted to operate in an outbound campaign mode.

A Web server 67 is provided within Internet 63 and connected to backbone 65. Server 67 is adapted in this embodiment as an interface server maintained within Internet 63 by the same entity hosting communication center 11 in a preferred embodiment. Server 63 is an access point for remote agents working with communication center 11. A host server 15 is also illustrated within Internet 63 and also connected to backbone 65. Host server 15 represents a third-party-hosted customer access point to interface for customers wishing to access communication center 11.

A plurality of software (SW) instances 61 are provided as distributed applications to PC/VDUs 55-59. SW 61 is adapted in a preferred embodiment as a presence agent capable of monitoring the present state of an agent's communication capabilities and current communication states at each agent station operating in communication center 11. In this example, SW 61 embodies a capability of monitoring and reporting agent communication capabilities according to much finer resolution than is practiced and current art. For example, SW 61 may be adapted to include standard communication capabilities such as e-mail, fax, IP phone, ICQ™ and other chat communication applications, file sharing programs, and any instant messenger applications. SW 61 may also report platform and word application parameters such as whether or not and agent has PowerPoint™ installed for Macintosh™ and so on. Also, types of media applications and associated platforms may also be reported by SW 61.

In a preferred embodiment of the present invention a plurality of agent proxies are provided for integrating agent status and communication capabilities and communicating such information to requesting applications. In the present example two agent proxy servers 18 are provided, each connected to LAN 39, and each running a software instance 17. Each of proxies 18 is responsible for and tracks states for one or more agent stations. In the present case one may be dedicated to agent stations 43 and 45, and the other to agent station 47. The skilled artisan will understand, as mentioned above, that there may be many more agent stations than the three shown, and there may also be many more agent proxies than the two shown.

In a communication center of the sort illustrated here there may be hundreds of agent stations varying in equipment and capability and distributed physically over a large premise, such as several floors of one building or over multiple buildings. In such a case there may be an agent proxy 18 executing software 17 on each floor of each building, connected to the LAN that connects all agent stations, with each agent proxy dedicated to and monitoring the agent stations on the same floor.

In some cases the group of agent proxies may be hierarchical. For example, in a very large center having several sites, there may be proxies at a lowest level, each monitoring a group of agent stations, then one or more higher-level proxies integrating the information of the lower-level proxies, such as one for each site, then a highest-level proxy integrating the information of the proxies dedicated to each site. The variations are numerous.

Proxy software 17 is responsible for authenticating an agent or agents assigned to it, as well as for receiving and combining assigned agent's presence information and making the same available to any observing application that subscribes to the information. Each agent running SW 61 has his or her current presence information and communication capabilities reported to a designated proxy or proxies 18. The described distributed system in a preferred embodiment may use a presence protocol to propagate the required information.

As examples of applications that subscribe to agent proxies 18, consider IPR 71 and CTI server 35. Each of these servers executes one or more routing applications for routing incoming events to agent stations. In a preferred embodiment of the present invention each of these servers subscribes t one or more agent proxies 18 for information to aid in efficient and effective routing of incoming events.

In one embodiment, wherein COST clients have an IVR option for routing, the communicated agent capabilities and states may be used to aid a caller with selection of a routing option. Such an option may be based on availability of an agent regarding another application. For example, if a call at LSW 21 is destined for an agent operating at station 47, but presence information indicates to a dedicated agent proxy that the agent is busy on a previous call or other activity, then the presence information may also report to the appropriate proxy that the agent is available using IP-assisted automated ordering wherein the caller elects to place an order through IVR function and is prioritized for that purpose. In this case, it may be that after a caller has entered the requested order information during IVR interaction, his or her call is transferred to the agent's IP phone wherein the agent takes the call and places the current COST call on hold to take the order. In this case the IVR server will be a subscriber to one or more of the agent proxies.

In some embodiments of the invention agents may not be on-site agents as shown in FIG. 1, but may be remote agents operating from home or another site not connected to LAN 39. In this case an instance of agent proxy software 17 may execute on WEB server 67 in Internet 63, wherein the WEB server is hosted by the entity operating communication center 11. In this case the remote agent(s) are tracked by instance 17 operating on server 67, and this instance may report to all the same subscribing applications as described above, such as IPR 71 and CTI 35 for routing incoming events.

Information made available to agent proxies by presence software instances 61 may be propagated on a periodic basis with relatively high frequency such as, perhaps every one minute or so. In a preferred embodiment, however, updates are made in agent status only when status changes. This method minimizes traffic on the LAN or other communication network that may be used.

Agent proxies may be adapted, as described above, to report presence information of a single agent or of a combination of agents, representing a work group, team or queue. There are no limits to the inclusion of varying types of media and communication capabilities utilized by agents within communication center 11. All that is required in order to enable reporting of active states of communication and capabilities to agent proxies is a network connection to the device supporting the communication capabilities or to a third-party component through which communication events of the media and question are routed and monitored. It can be seen in this example that the distributed system of the present invention can be implemented on existing equipment without the addition of a centralized server for managing the process.

In preferred embodiments an agent proxy can combine status information from different terminals and different devices for a single agent into combined information for that agent. This capability is illustrated further below, particularly with reference to FIG. 3. Also, in some embodiments a presence agent will connect to only one or two proxies. Connecting to two proxies provides reliability and redundancy. There could be even more redundancy, but this is not typically necessary.

Figure 2:
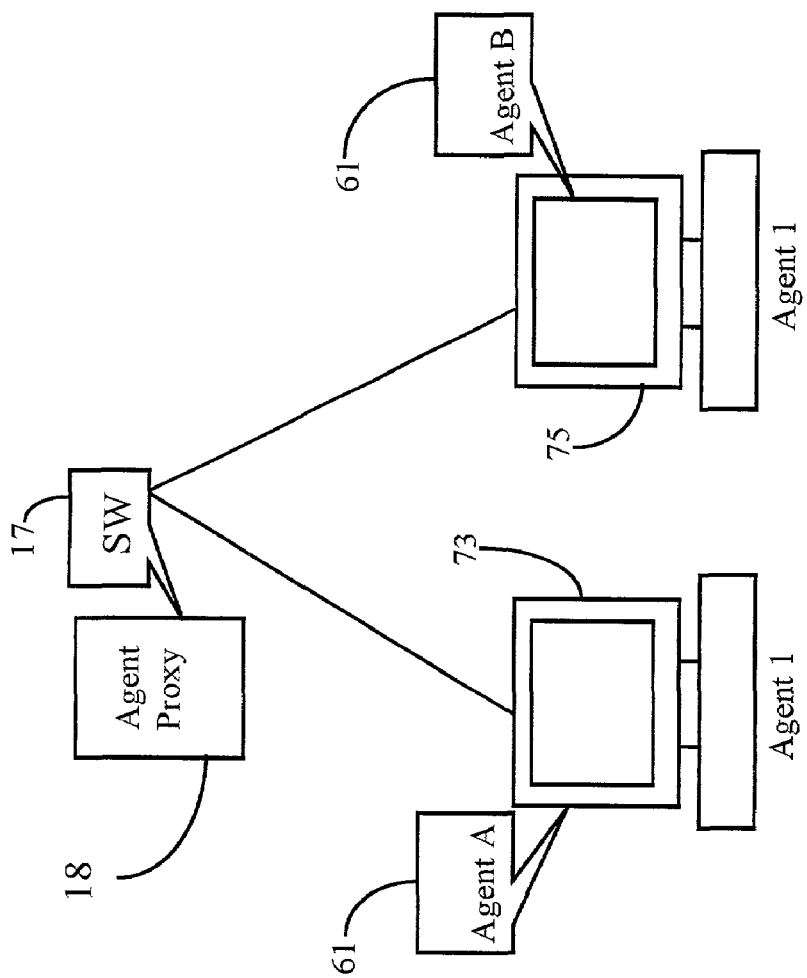
FIG. 2 is a connection diagram illustrating capability-based call management for an agent operating one computer terminal according to an embodiment of the present invention.

FIG. 2 is a diagram illustrating status management capabilities for an agent having more than one computer terminal according to an embodiment of the present invention. In this example, an agent, labeled herein as agent 1, is operating two separate PC terminals 73 and 75. In this case PC terminal 73 may be adapted for a specific type of data communication while PC terminal 75 may be adapted for another type of data communication. In this example, agent 1 is utilizing two separate presence agents, a presence agent A running on PC terminal 73, and a presence agent B running on PC terminal 75. A single agent proxy SW 17 for agent 1 resides on a server 18, analogous to agent proxy 18 of FIG. 1.

Agent presence applications A and B are analogous to SW 61 of FIG. 1 above. In this example, agent proxy SW 17 receives the presence and capabilities information from both presence agent A and presence agent B, and combines them into a single presence entity, which may be reported to an observing and subscribing application such as any routing application in the system.

Presence information may be in the form of Extensible Markup Language (XML) as is used in recent presence protocols. It is noted herein, that if agent 1 is only logged on to the system through PC terminal 73 and PC terminal 75 is logged off, then agent proxy SW 17 would only utilize presence information provided by presence agent A. It will be apparent to one with skill in the art that as a distributed component, proxy 17 functions independently from any other proxy component that may be covering additional agents.

There are in this case, no parent applications or central control applications to which proxy agent 17 or presence agents A or B, for that matter, depend upon. Therefore, an overall system covering many agents will continue to function normally if, for example, proxy 17 and presence instances A and B cease to function for any reason. In some embodiments, as described above, presence agents at a single station may report to more than one agent proxy, in which case the failure of one of the agent proxies would not damage system performance. Prior art systems that rely on a central control station or server are vulnerable if for some reason the central controlling host malfunctions or becomes disabled. Moreover, the flexibility provided by distributed components enables agents to utilize the communications applications and platform types to which they are most accustomed. This feature is especially beneficial in a communication network wherein agents operate from remote PCs such as in home office environments. In these cases, the presence reporting capability is compatible with standard transport protocols such as Transfer Control Protocol/Internet Protocol (TCP/IP) utilized on Internet 63 (FIG. 1).

Figure 3:
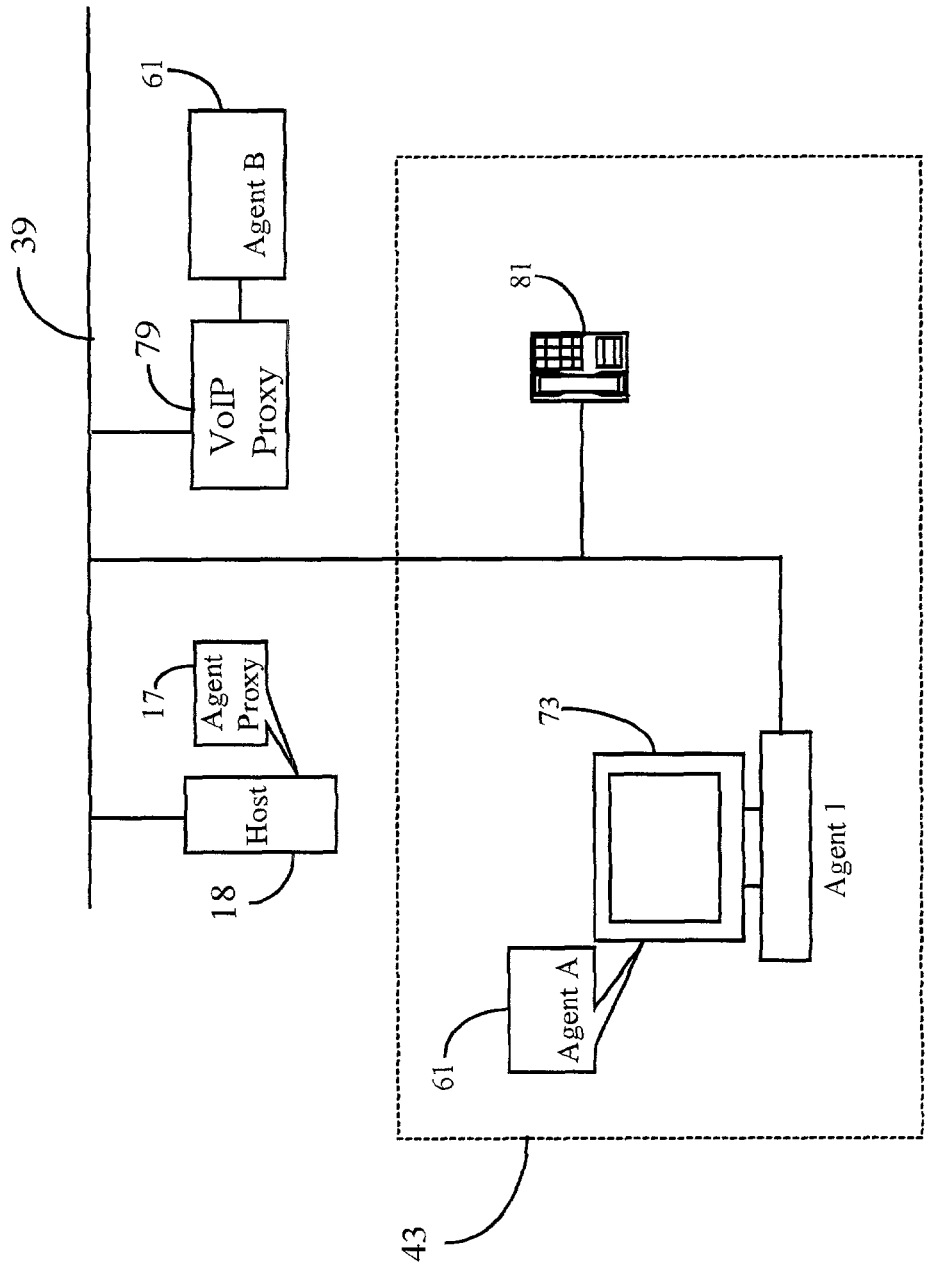
FIG. 3 is a connection diagram illustrating capability-based call management for an agent operating one computer terminal and a telephone according to an embodiment of the present invention.
Figure 4:
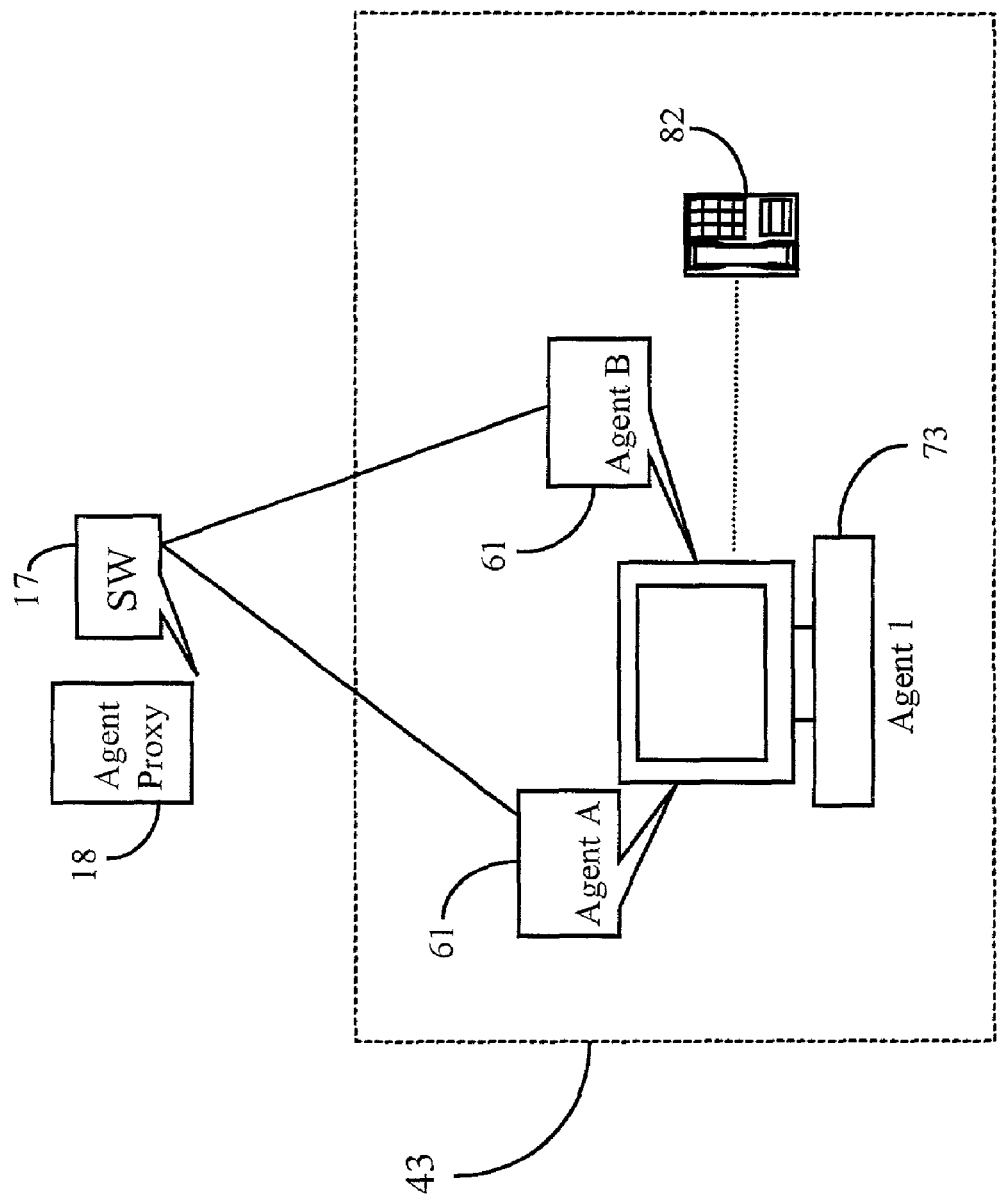
FIG. 4 is a connection diagram illustrating capability-based call management wherein two CC/PP agents are running parallel on one computer terminal with a connected telephone.

FIG. 3 is a diagram illustrating status management capabilities for an agent operating a computer and a telephone operating by Voice over IP (VoIP) protocol. An agent station 43 is illustrated (See FIG. 1) wherein an agent 1 has access to a PC/VDU 73 and a VoIP telephone 81. Both are connected to LAN 39. A presence agent A (61) executes on PC/VDU 73 and reports status to agent proxy 18 running SW 17. Telephone 81 operates through a VoIP proxy 79, which also executes an instance of presence agent 61, which in turn reports to agent proxy 18. Agent proxy 18 responsible for agent station 43 in this example thus gets status information for both the VoIP telephone and the PC/VDU at agent station 73, and combines the information for an integrated status for station 43. FIG. 4 is a connection diagram illustrating status management capabilities for an agent operating a computer PC/VDU 73 and a connected IP phone 82. In this example, agent 1 is responsible for communication events routed to PC 73 and communication events routed to IP telephone 82. IP phone 82 is Internet-capable and adapted to receive calls originating from Internet 63 of FIG. 1 above. In this case, there are 2 presence agents, A) and B both running on PC 73, both labeled 61. Presence agent A monitors communication applications executing on PC 73 while presence agent B monitors activity states of IP phone 82. It is assumed in this example that IP phone 82 cannot locally support software 61. Both agents A and B report to agent proxy SW 17 running on agent proxy 18. In this case, VoIP events are handled through PC/VDU 73 acting as a host. The presence reporting capabilities of agent B are built on top of a telephony application programming interface (TAPI) protocol. It is noted herein that in one embodiment presence agents A and B may be combined as one presence agent reporting communication and capability states of PC 73 and IP phone 82 as will be described below.

Figure 5:
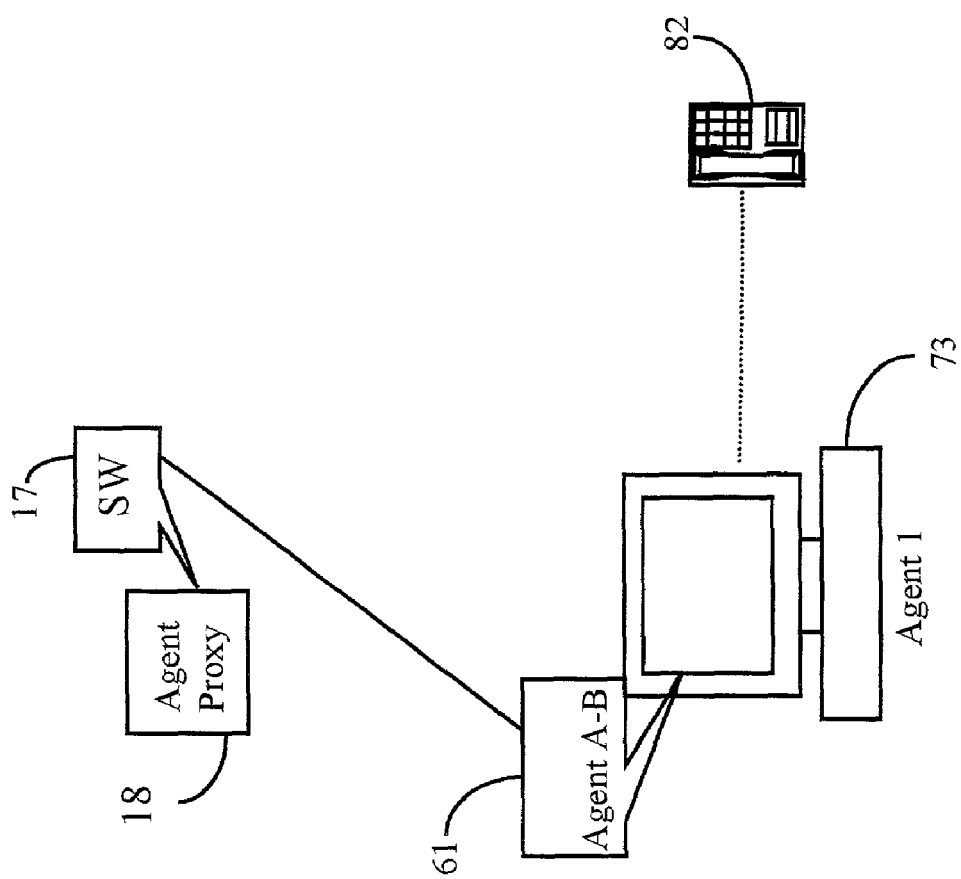
FIG. 5 is a connection diagram illustrating capability-based call management wherein two CC/PP agents are running combined on one computer terminal with a connected telephone.

FIG. 5 is a diagram illustrating status management capabilities using a combined presence application. A single presence application 61 (A-B) is provided and combines the monitoring and reporting duties of presence agents A and B of FIG. 4. In this case, IP phone 82 is either serially (cabled) or universally (USB cabled) connected to PC 73 for status monitoring purposes and telephony management. Proxy SW 17 operates on agent proxy 18, which receives all of the capability and activity information of PC 73 and of IP phone 82.

It is noted that although a PC and phone combination are used in the examples presented herein, other communications devices and/or systems may be monitored by presence agents executing on the monitored device or system, or executing on a connected processor or routing device. For example, an automated fax machine may have a facsimile queue that is monitored by a presence agent. The presence agent, in this case, reports to an agent proxy the number of faxes waiting to be sent and the estimated time of receipt of a fax as requested by an observing application on behalf of a customer request, for example. Therefore, a presence application can be personalized to a communications terminal shared by many agents and does not necessarily have to be personalized to a single agent or to a controlled agent group.

Figure 6:
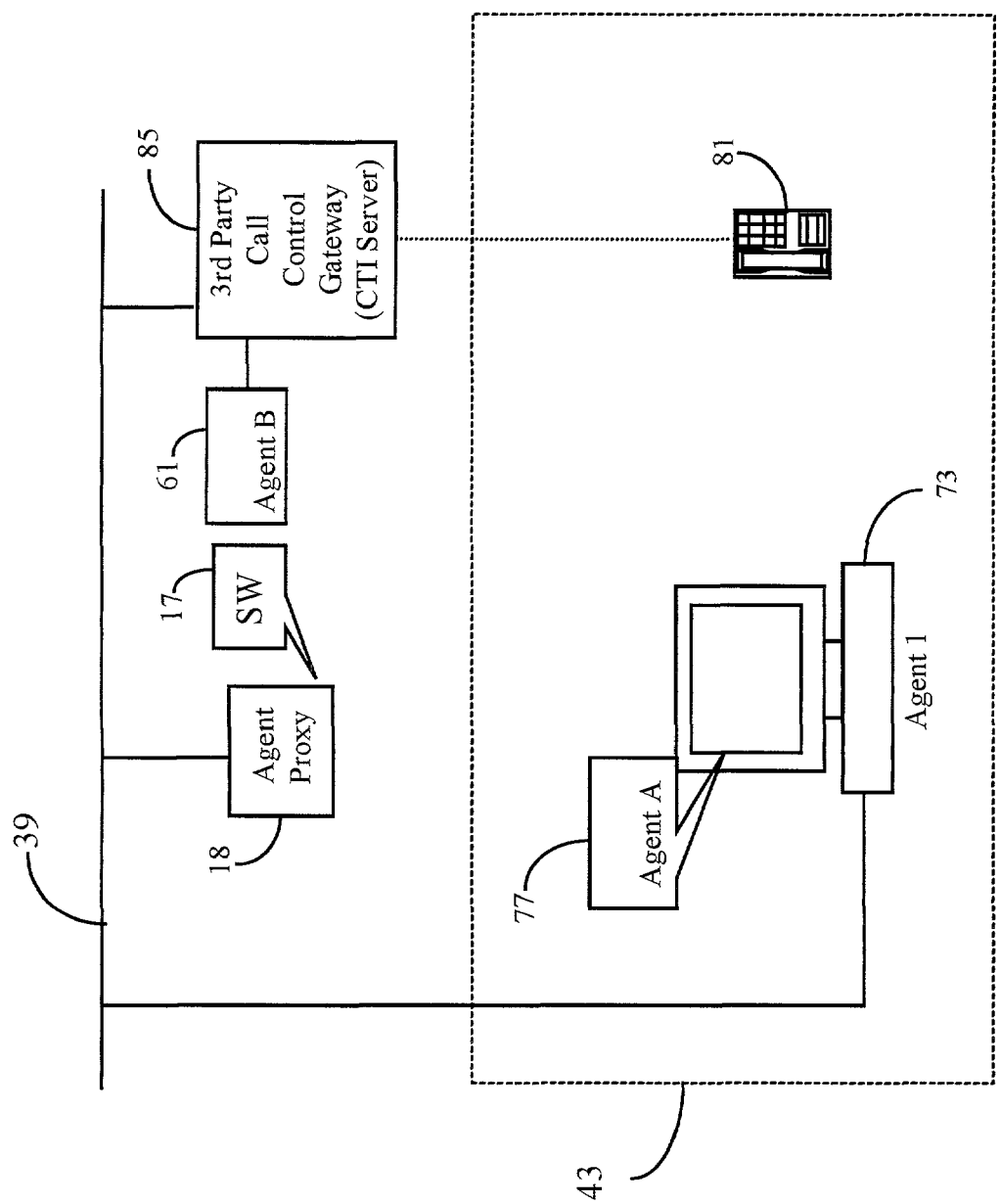
FIG. 6 is a connection diagram illustrating capability-based call management utilizing a third party gateway.

FIG. 6 is a diagram illustrating status management capabilities utilizing a third party gateway 85. In some cases, wherein a particular communications terminal cannot be locally monitored, a presence agent may be utilized to monitor a communications gateway associated with a target device. Such a case is illustrated here. In this case a telephone 81 is operated through third-party gateway 85, and an instance of presence server SW 61 is provided to and executes on the gateway server 85, where it monitors status for phone 85. The gateway is shown as connecting to LAN 39, thence to agent proxy 18, but may communicate indirectly with agent proxy 18, which operates with an instance of SW 17 and integrates status information for agent station 43.

Several specific embodiments of the present invention have been described in some detail herein, and it is emphasized that these are exemplary, and the invention may manifest in a variety of ways. For example, the embodiments described have been primarily within a communication center providing status information for subscribing applications also within the communication center. In alternative embodiments there may be several call centers each with multiple agents and agent stations, and agent proxies may be provided for groups of agents at each call center, and in a hierarchical fashion higher-level agent proxies may be provided integrating information for each center and for groups of centers, and for all centers. Subscribing applications may be local to a call center, or may subscribe across networks to different call centers, for example. The capabilities of the distributive aspects of the present invention render it useful over a diverse topology in this manner. Subscribing applications in such a system may well be network-level routers, now capable of agent-level routing over a very diverse structure and over a combination of devices, networks, and protocols.

Capability-Based Routing

In another aspect of the present invention a distributed software system is employed to monitor and report, in particular, capabilities of agent's resources, and these capabilities are reported to subscribing applications, in particular routing applications, such that intelligent routing of all sorts of electronic transactions, including telephone calls, e-mails, video-conferencing, Internet related events, and the like, may be done taking into account the specific capabilities of agent resources.

In preferred embodiments of the invention capability-based routing may be accomplished within the same architecture as shown in FIGS. 1-6 and described in detail above, wherein primarily agent status is monitored and reported to subscribing applications. Referring again to FIG. 1, there are shown proxy servers 18 coupled to LAN 41, each executing a version of software 17. In the embodiments described above for agent status reporting, these servers are receiving status of agent resources, particularly status of communication devices, from instances of software 61 operating, in the case of FIG. 1, in agent stations, such as on PCs in those stations. In the previously-described embodiments software 61 reports status of communication devices to software 17 executing on servers 18, and servers 18 provide agent status, derived from these status reports, to requesting applications.

In an alternative preferred embodiment of the present invention SW 61 reports capabilities of hardware and software resources to software 17 executing, for example, on servers 18. Software 61 may accomplish this purpose using, for example, a CC/PP protocol framework and RDF data formatting to provide collected information to subscribing applications through proxies 18 executing SW instances 17. It will be apparent to the skilled artisan that the CC/PP protocol is exemplary only, and other candidate protocols may be used. SW 61 comprises a discovery and data-preparation application that may or may not include an agent interface for imputing preference information.

Generally speaking, in a preferred embodiment, the capability data is rendered by SW instances 17 to routing applications, which are enabled to use the capability data in making routing decisions for all sorts of electronic events related to communication centers. Such routers may execute in a number of locations and in a number of ways, but in the example of FIG. 1 such routers would typically execute as a portion of T-Server (TS) software illustrated as executing on CTI servers 35 (in the communication center shown) and 23 (in the network). Routing may also be done by IP router 71 using data from servers 18 monitoring capabilities of agent resources, and in some instances by Web server 67.

An instance of SW 17 is illustrated as operating on Web server 67, and is useful in monitoring and reporting capabilities of remote agent resources, where agents associated with communication center 11 may be operating from home, for example.

There are many uses and advantages in routing having access to the hardware and software capabilities of agent resources. For example, routers may have access to many different requirements for incoming communication events. Certain communication events, for example, require specific hardware and/or software. A communication in a specific message protocol should not be routed to an agent whose resources (equipment and/or software) cannot support the protocol, and there will always be instances in any communication center, and certainly across a plurality of centers to which communications may be routed, wherein not all agent stations support the same communications systems and protocols.

As another example, it is well-known in the art that capabilities of communication centers are in need of continual or at least periodic upgrading. New hardware and software is developed, and cannot be installed uniformly across multiple hardware architectures instantly. Such upgrading also takes time. Capability-based routing, wherein routers have up-to-date information on agent resource capabilities, can guide efficient and reasonable routing as resources change. Even in stable situations, in diverse systems, not all stations will be standard, and in some instances it may well be advisable to have certain agents enabled is special ways to provide for special needs. The ability provided by the present invention to periodically poll each agent station for hardware and software capability allows for efficient and highly successful routing of all sorts of communication events, not just COST or IP telephone events. Moreover, in the case of upgrading, the ability to monitor which agents are upgraded and which are not, so communication events requiring upgraded agents can be properly routed, removes considerable pressure from those responsible for upgrading projects, which now can be accomplished over a longer time period rather than in a rush.

As another example of the advantages and use of capability-based routing, a person (potential client) browsing the Web may encounter a Web page hosted by the same entity hosting communication center 11. The client browsing the Web may, through an interface on the Web page, fill out a form for any one of many reasons. Encountering difficulty, the client may wish to ask for help. There can be two (for example) buttons on the page, one with "Ask for help—I am Using Explorer" and the other "Ask for Help—I am Using Netscape". The system (refer to FIG. 1) can now discriminate, and be sure to route the request for help to an appropriately-enabled agent; that is, one having the same browser application as the requesting client.

In FIG. 2 through FIG. 6 instances of SW 61 are illustrated as executing on various devices and platforms. In above description of these figures, relative to status monitoring and provision to subscribing applications, these SW instances are described as presence agents. In the instant embodiment related to capability-based routing these agents are agents capable of reporting capabilities, such as the above-described CC/PP protocol. Just as in the case of presence agents, however, the capability-reporting agents may execute on PCs, individual communication devices capable of supporting the SW agents, device-enabling proxies, such as VoIP proxies, and gateways and the like. The intent is that the SW agents execute on platforms associated with specific equipment used by agent persons, and report capabilities of hardware and software available to and used by the agent persons. In alternative embodiments of the invention SW agents 61 may be SW capable of both capability and state monitoring.

Just as described for the presence agent system above, servers 18 supporting capability data integration and reporting to principally routing applications, may be arranged in various architecture arrangements. There may be one specific server monitoring capabilities of a set of agent resources at agent stations in a communication center, and another server dedicated to another set of agent resources. The number of servers and the association may vary in a variety of ways. SW agents 61 may report to more than one server for redundancy. Servers may be arranged in a hierarchical fashion as previously described, and architecture may span multiple call centers, and so on.

Given the teachings provided thus far for capability-based routing, it should be clear to the skilled artisan that the very nature of many sorts of communication events provides discrimination information for routers of various sorts. For example, one would not route e-mails to agents having no software ability to interact with e-mails. Moreover, much better service may be provided, for example in the e-mail case, if both the client and the agent have the same e-mail software, rather than radically-different software.

One with skill in the art will appreciate that there may be many other situations wherein having capability data available at routing points can prove useful in enabling callers interaction goals whatever they may be. It will also be apparent that the same process may be implemented in a purely IP environment whether the caller connects to a communication center through an on-line server hosted by the center, or a third party server hosting the interaction at network level as in a chat server. There are many possibilities.

The present invention may be practiced in any networked communication environment. The invention is not limited to organized call-center embodiments. For example, a communication network may be made up of remote agents operating from home offices wherein access to those agents is possible through the Internet or other DPN. In this case, capability information may be automatically polled from both agent and client terminals by a third-party server node, gateway, or a combination of the above. Presence protocol and instant message capabilities may also be integrated into a capability routing scheme.

Further to the above, the present invention as taught in various embodiments above is a good solution to the well-known agent hot-desking problem in the art. Hot desking means an agent may work at one desk one day, a different desk at another time, and from home, for example, at another time. If the desks have different capabilities, and in the absence of the present invention, hot-desking is not practical, even though desirable, because skill information is associated with an agent at the time of configuration, that is, permanently. capability-based routing solves this problem because capabilities are really related to the desk, and only temporarily assigned to the agent for the time the agent uses the desk.

The method and apparatus of the present invention may be applied to a variety of embodiments and incorporate information about virtually any type of network-accessible terminal or device and should be afforded the broadest scope under examination. The spirit and scope of the present invention is limited only by the claims that follow.

What is claimed is:

1. An agent capability application comprising a computer readable medium and executing on a computer platform, for monitoring target agent resources and rendering capability information to routing applications, comprising:
   a first portion for monitoring and collecting data regarding capability of the target agent resources, said target resources including at least one or more communication devices at individual agent stations including at least application, program and protocol capability; and
   a second portion for integrating the data and rendering the capability information to the routing applications;
   wherein multiple copies or versions of the first portion execute on platforms monitoring individual ones of the one or more communication devices by periodically polling the target agent resources and providing data to at least one agent proxy server executing a copy of the second portion, the at least one agent proxy server dedicated to integrating the data for the one or more communication devices and providing the data to the routing applications which use at least a portion of the integrated capability data for routing calls to the best destinations.

2. The agent capability application of claim 1 wherein one or more of the platforms upon which the first portions execute are computers in the agent stations.

3. The agent capability application of claim 1 wherein the platform upon which the first portions execute comprise individual ones of the one or more communication devices.

4. The agent capability application of claim 1 wherein the platform upon which the first portions execute comprises an individual service proxy platform also enabling services for one of the communication devices.

5. The agent capability application of claim 4 wherein the service proxy platform is a Voice-over-Internet Protocol (VoIP) proxy enabling a VoIP telephone.

6. The agent capability application of claim 4 wherein the service proxy platform is a call-control gateway platform.

7. The agent capability application of claim 1 wherein the first portions provide data to more than one agent proxy server to provide redundancy.

8. The agent capability application of claim 1 wherein the platform, agent stations and routing applications are all a part of a single communication center.

9. The agent capability application of claim 1 wherein the platform, agent stations and routing applications are distributed over a plurality of communication centers.

10. The agent capability application of claim 1 wherein more than one first portion is dedicated each to distinct ones of the communication devices associated with a single agent station, and the data from the more than one first portion is aggregated for the single agent station at the agent proxy server associated with the single agent station.

11. The agent capability application of claim 1 comprising multiple sets of agent stations having communication devices monitored by the copies or versions of the first portion and multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers.

12. The agent capability application of claim 11 wherein the platform, agent stations and routing applications are all a part of a single communication center.

13. The agent capability application of claim 11 wherein the platform, agent stations and routing applications are distributed over a plurality of communication centers.

14. An agent proxy system operable in at least one communication center, the system comprising:
   agent resources including at least one or more communication devices at individual agent stations enabling agents to process communication events;
   one or more agent proxy servers;
   one or more routing applications subscribing to one or more of the agent proxy servers;
   a communication network connecting the agent resources, the applications and the one or more agent proxy servers; and
   a computer readable medium including multiple copies of a capability application executing on a computer platform for monitoring capabilities of the communication devices by periodic polling of the communication devices determining at least application, program and protocol capabilities of the communication devices, and for rendering the capability information to the subscribing routing applications, the capability application having a first portion for collecting information regarding the capabilities of the target agent resources, and a second portion at the agent proxy servers for integrating the information and rendering the capability information to the subscribing routing applications.

15. The agent proxy system of claim 14 wherein the platform upon which the first portions execute are computers in the agent stations.

16. The agent proxy system of claim 14 wherein the platform upon which the first portions execute comprises individual ones of the one or more communication devices.

17. The agent proxy system of claim 14 wherein the platform upon which the first portions execute comprises an individual service proxy platform also enabling services for one of the communication devices.

18. The agent proxy system of claim 17 wherein the service proxy platform is a Voice-over-Internet-Protocol (VoIP) proxy enabling a VoIP telephone.

19. The agent proxy system of claim 17 wherein the service proxy platform is a call-control gateway platform.

20. The agent proxy system of claim 14 wherein the first portions provide data to more than one agent proxy server to provide redundancy.

21. The agent proxy system of claim 14 wherein the communication center.

22. The agent proxy system of claim 14 wherein the platform, agent stations and routing applications are distributed over a plurality of communication centers.

23. The agent proxy system of claim 14 wherein more than one first portion is dedicated each to distinct ones of the communication devices associated with a single agent station, and the data from the more than one first portion is aggregated for the single agent station at the agent proxy server associated with the single agent station.

24. The agent proxy system of claim 14 comprising multiple sets of agent stations having communication devices monitored by the copies of the first portion and multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers.

25. The agent proxy system of claim 24 wherein the platform, agent stations and routing applications are all a part of a single communication center.

26. The agent proxy system of claim 24 wherein the platform, agent stations and routing applications are distributed over a plurality of communication centers.

27. In a communication center system, a method for providing agent resource capabilities to subscribing routing applications, the method performed by software read from a computer readable medium executing on a computer platform comprising the steps of:
(a) providing multiple copies of an agent resource capability application monitoring capabilities of individual agent resources including one or more communication devices at individual agent stations, by a first portion of the application executing on a computer platform periodically polling the individual agent resources, the capabilities including at least application, program and protocol capabilities; and
(b) integrating data from step (a) and rendering the agent resource capabilities to the subscribing routing applications by a second portion of the agent resource capability application,
(c) routing calls to the best destination by the routing applications using at least a portion of the integrated agent resource capabilities.

28. The method of claim 27 wherein the platform upon which the first portions execute are computers in the agent stations.

29. The method of claim 27 wherein the platform upon which the first portions execute comprises individual ones of the one or more communication devices.

30. The method of claim 27 wherein the platform upon which the first portions execute comprises individual service proxy platforms also enabling services for one of the communication devices.

31. The method of claim 30 wherein the service proxy platform is a Voiceover-Internet-Protocol VoIP) proxy enabling a VoIP telephone.

32. The method of claim 30 wherein the service proxy platform is a call-control gateway platform.

33. The method of claim 27 wherein the first portions provide data to more than one agent proxy server to provide redundancy.

34. The method of claim 27 wherein the platform, agent stations and routing applications are all a part of a single communication center.

35. The method of claim 27 wherein the platform, agent stations and routing applications are distributed over a plurality of communication centers.

36. The method of claim 27 wherein more than one first portion is dedicated each to distinct ones of the communication devices associated with a single agent station, and the data from the more than one first portion is aggregated for the single agent station.

37. The method of claim 27 comprising multiple sets of agent stations having communication devices monitored by the copies or versions of the first portion and multiple agent proxy servers executing copies of the second portion, wherein agent proxy servers are associated in a hierarchical fashion, such that higher-level agent proxy servers aggregate data from multiple lower-level agent proxy servers with which each higher- level server is associated, the aggregated data at the higher level servers comprising data from all of the agent stations associated with each of the lower-level servers.

38. The method of claim 37 wherein the platform, agent stations and routing applications are all a part of a single communication center.

39. The method of claim 37 wherein the platform, agent stations and routing applications are distributed over a plurality of communication centers.

* * * * *